(12) United States Patent
Chitta et al.

(10) Patent No.: US 9,232,607 B2
(45) Date of Patent: Jan. 5, 2016

(54) GAS DISCHARGE LAMP BALLAST WITH RECONFIGURABLE FILAMENT VOLTAGE

(71) Applicant: Lutron Electronics Inc., Co., Coopersburg, PA (US)

(72) Inventors: Venkatesh Chitta, Center Valley, PA (US); Jonathan Robert Quayle, Bethlehem, PA (US); Brent M. Gawyrs, Whitehall, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 13/782,639

(22) Filed: Mar. 1, 2013

(65) Prior Publication Data

US 2014/0111111 A1 Apr. 24, 2014

Related U.S. Application Data

(60) Provisional application No. 61/717,607, filed on Oct. 23, 2012.

(51) Int. Cl.
| H05B 37/02 | (2006.01) |
| B23P 6/00 | (2006.01) |
| H05B 41/16 | (2006.01) |
| H05B 41/295 | (2006.01) |

(52) U.S. Cl.
CPC . *H05B 37/02* (2013.01); *B23P 6/00* (2013.01); *H05B 41/16* (2013.01); *H05B 41/295* (2013.01); *Y10T 29/49716* (2015.01)

(58) Field of Classification Search
CPC ... H05B 41/042; H05B 41/044; H05B 41/046

USPC ........ 315/226, 276, 283, 291, DIG. 2, DIG. 5
See application file for complete search history.

(56) References Cited

U.S. PATENT DOCUMENTS

| 3,971,967 A | 7/1976 | Hawkins |
| 4,207,498 A | 6/1980 | Spira et al. |
| 4,210,846 A | 7/1980 | Capewell et al. |
| 4,663,566 A | 5/1987 | Nagano |
| 4,998,046 A | 3/1991 | Lester |
| 5,128,592 A * | 7/1992 | Dean et al. .................... 315/224 |
| 5,132,595 A | 7/1992 | Kulka et al. |
| 5,173,643 A | 12/1992 | Sullivan et al. |
| 5,287,040 A | 2/1994 | Lestician |
| 5,416,387 A | 5/1995 | Cuk et al. |
| 5,623,184 A | 4/1997 | Rector |

(Continued)

*Primary Examiner* — Thuy Vinh Tran
(74) *Attorney, Agent, or Firm* — Condo Roccia Koptiw LLP (57) ABSTRACT

An amount of filament voltage supplied by a reconfigurable ballast may be adjusted based on a lamp type with which the ballast is operating. The filament voltage may be reconfigured dynamically and/or may be reconfigured via a user-provided value. An electronic dimming ballast may include a control circuit configured to control generation of the AC filament voltage in accordance with a reconfigurable AC filament voltage value. Reconfiguring an electronic dimming ballast may include reconfiguring an AC filament voltage applied by the electronic dimming ballast to a filament of a lamp installed with the electronic dimming ballast. Reconfiguring the AC filament voltage may include computing a hot-to-cold cathode resistance ratio associated with the filament. Reconfiguring the AC filament voltage may include determining whether the computed hot-to-cold cathode resistance ratio is within a range specified for the electronic dimming ballast.

5 Claims, 8 Drawing Sheets

(56) References Cited

U.S. PATENT DOCUMENTS

| | | |
|---|---|---|
| 5,656,891 A | 8/1997 | Luger et al. |
| 5,703,441 A | 12/1997 | Steigerwald et al. |
| 5,710,488 A | 1/1998 | Nilssen |
| 5,841,239 A | 11/1998 | Sullivan et al. |
| 5,920,155 A | 7/1999 | Kanda et al. |
| 6,531,831 B2 | 3/2003 | Chou et al. |
| 6,819,063 B2 | 11/2004 | Nemirow |
| 6,838,837 B2 | 1/2005 | Newsome |
| 6,876,157 B2 * | 4/2005 | Henry ............... 315/219 |
| 7,176,639 B2 | 2/2007 | Hu et al. |
| 7,247,991 B2 | 7/2007 | Chen et al. |
| 7,391,297 B2 | 6/2008 | Cash et al. |
| 7,564,200 B2 * | 7/2009 | Ichikawa et al. ......... 315/308 |
| 7,586,268 B2 | 9/2009 | Gawrys et al. |
| 7,764,162 B2 | 7/2010 | Cash et al. |
| 7,880,405 B2 | 2/2011 | Chitta et al. |
| 8,129,920 B2 * | 3/2012 | Sasakawa ............. 315/287 |
| 8,212,497 B2 * | 7/2012 | Yadlapalli et al. ......... 315/294 |
| 8,228,163 B2 | 7/2012 | Cash et al. |
| 8,288,956 B1 * | 10/2012 | Xiong et al. ............ 315/244 |
| 8,294,384 B2 * | 10/2012 | Matsuda ............ 315/279 |
| 8,324,813 B1 * | 12/2012 | Xiong ................. 315/94 |
| 8,368,307 B2 | 2/2013 | Cash et al. |
| 8,593,078 B1 * | 11/2013 | Xiong .................. 315/307 |
| 8,723,429 B2 * | 5/2014 | Yao et al. .............. 315/178 |
| 2006/0119276 A1 | 6/2006 | Waymouth et al. |
| 2007/0132401 A1 * | 6/2007 | Gawrys et al. ........... 315/274 |
| 2008/0278086 A1 | 11/2008 | Chitta et al. |
| 2009/0273299 A1 | 11/2009 | Gawrys et al. |
| 2010/0109548 A1 | 5/2010 | Matsuda |
| 2011/0266959 A1 | 11/2011 | Taipale et al. |
| 2012/0043899 A1 | 2/2012 | Veskovic |
| 2012/0043903 A1 | 2/2012 | Quayle et al. |

* cited by examiner

GAS DISCHARGE LAMP BALLAST WITH RECONFIGURABLE FILAMENT VOLTAGE

CROSS REFERENCE TO RELATED APPLICATIONS

This application claims the benefit of Provisional U.S. Patent Application No. 61/717,607, filed Oct. 23, 2012, the disclosure of which is incorporated herein by reference in its entirety.

BACKGROUND

A typical fluorescent lamp includes a sealed glass tube containing a rare earth gas, and an electrode at each end for striking and maintaining an electric arc through the gas. The electrodes are typically constructed as filaments to which a filament voltage is applied to heat the electrodes, thereby improving their capability to emit electrons. This results in improved electric arc stability and longer lamp life.

Typical prior art ballasts apply the filament voltage to the filaments prior to striking the arc and maintain the filament voltages throughout the entire dimming range of the lamp. At low end, when light levels are lowest and, consequently, the electric arc is at its lowest level, the filament voltage helps maintain a stable arc current. At high end, when light levels are highest, and the electric arc current is at its highest level, the electric arc current contributes to heating the filaments.

Figure 1:
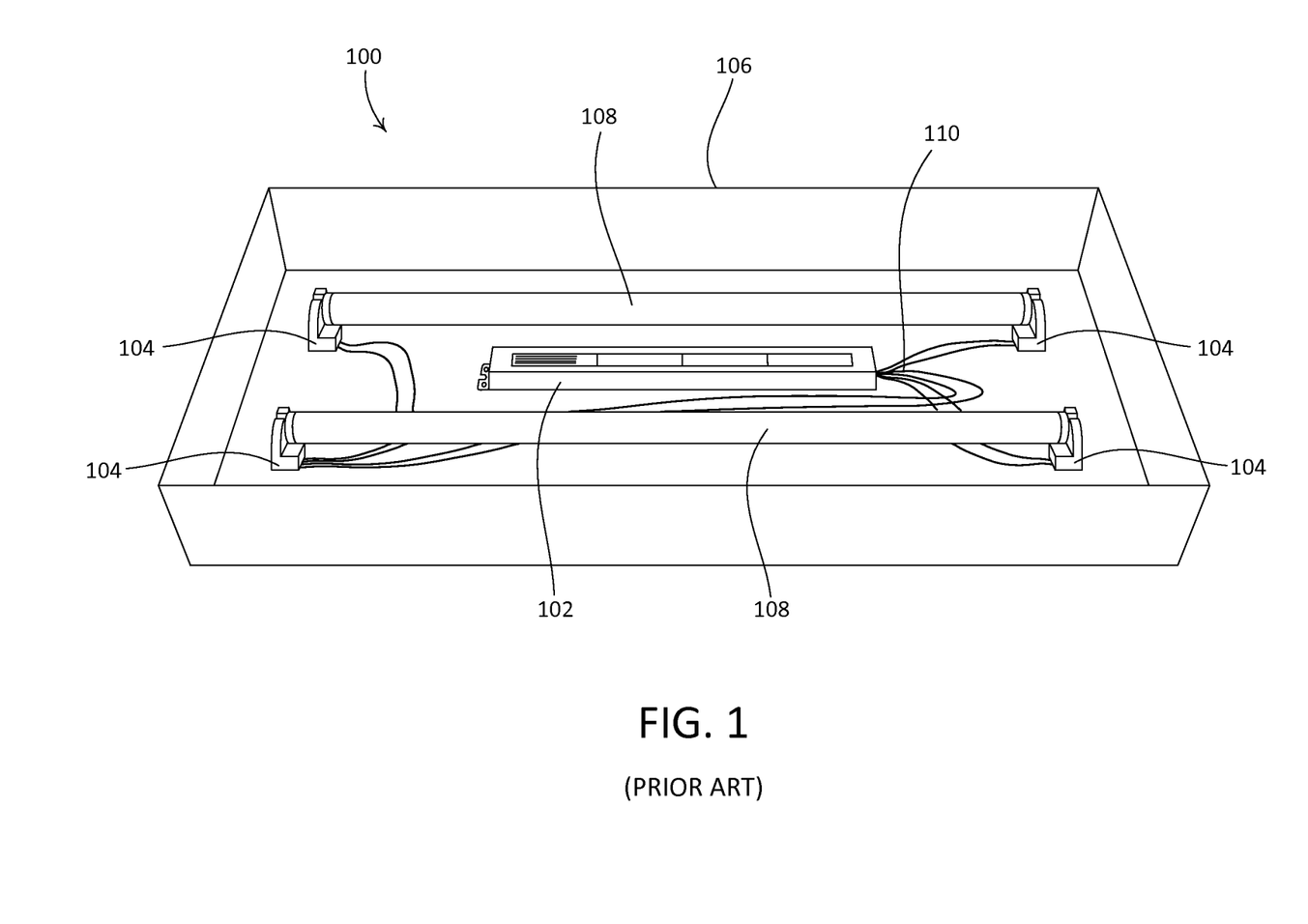
FIG. 1 is a perspective view of an example gas discharge lamp fixture.

FIG. 1 is a perspective view of an example gas discharge lamp fixture 100. The fixture 100 includes a ballast 102, lamp sockets 104, and a housing 106. The ballast 102 and the sockets 104 may be fixed to the housing 106. The lamp sockets 104 may be sized and situated within the housing 106 to hold lamps 108. The ballast 102 may have wires 110 to connect the ballast 102 to the sockets 104 for driving the lamps 108 and for providing heating current, discussed above. In practice, the ballast 102 may be wired by a fixture supplier, as is common in new construction, or it may be wired by an on-site installer, as is common in retrofit projects.

A typical ballast may be configured for operation with a particular lamp type, for instance, a lamp from a particular manufacturer. The ballast may be configured, for example, at the time the ballast is manufactured or at the time the ballast is installed. For example, a ballast may be configured to apply a pre-determined filament voltage to the lamps, such that that the filaments of each lamp will be heated in accordance with an optimal range of filament heating temperatures associated with that lamp type. If too much or too little filament voltage is applied, the filaments of the lamps may be under heated or overheated, which may detrimentally affect the lamps, for example, by shortening the useful lives of the lamps.

Lamps from different manufactures typically have different optimal ranges of filament heating temperatures. Accordingly, if a ballast is configured to operate with a first lamp type, and then actually operated with a second lamp type, the ballast may not heat the filaments of the second lamp type within the optimal range for that lamp type.

SUMMARY

The filament voltage supplied by a ballast may be reconfigurable. An amount of filament voltage supplied by the reconfigurable ballast may be adjusted based on the lamp type with which the ballast is actually operating. The filament voltage may be reconfigured dynamically and/or may be reconfigured via a user-provided value.

A method of reconfiguring an alternating current filament voltage for use by an electronic dimming ballast includes supplying a first filament voltage to a filament of a lamp installed with the electronic dimming ballast. A signal indicative of supplying a second filament voltage to the filament is received, where the second filament voltage is different from the first filament voltage. The signal includes an integer value pertaining to a particular type of the lamp installed with the electronic dimming ballast. The second filament voltage may then be supplied to the filament.

The signal may be received from a control circuit in electrical communication with the electronic dimming ballast. Such a control circuit may reference a lookup table that includes a first entry pertaining to the integer value and a second entry that includes the second filament voltage. The first and second entries may be associated with one another. The electronic dimming ballast may be electrically connected to a ballast network. The signal may be received from a central control function associated with the ballast network. A hot-to-cold cathode resistance ratio associated with the lamp may be computed, and whether the computed hot-to-cold cathode resistance ratio is within a range specified for the electronic dimming ballast may be determined.

DETAILED DESCRIPTION

Figure 2:
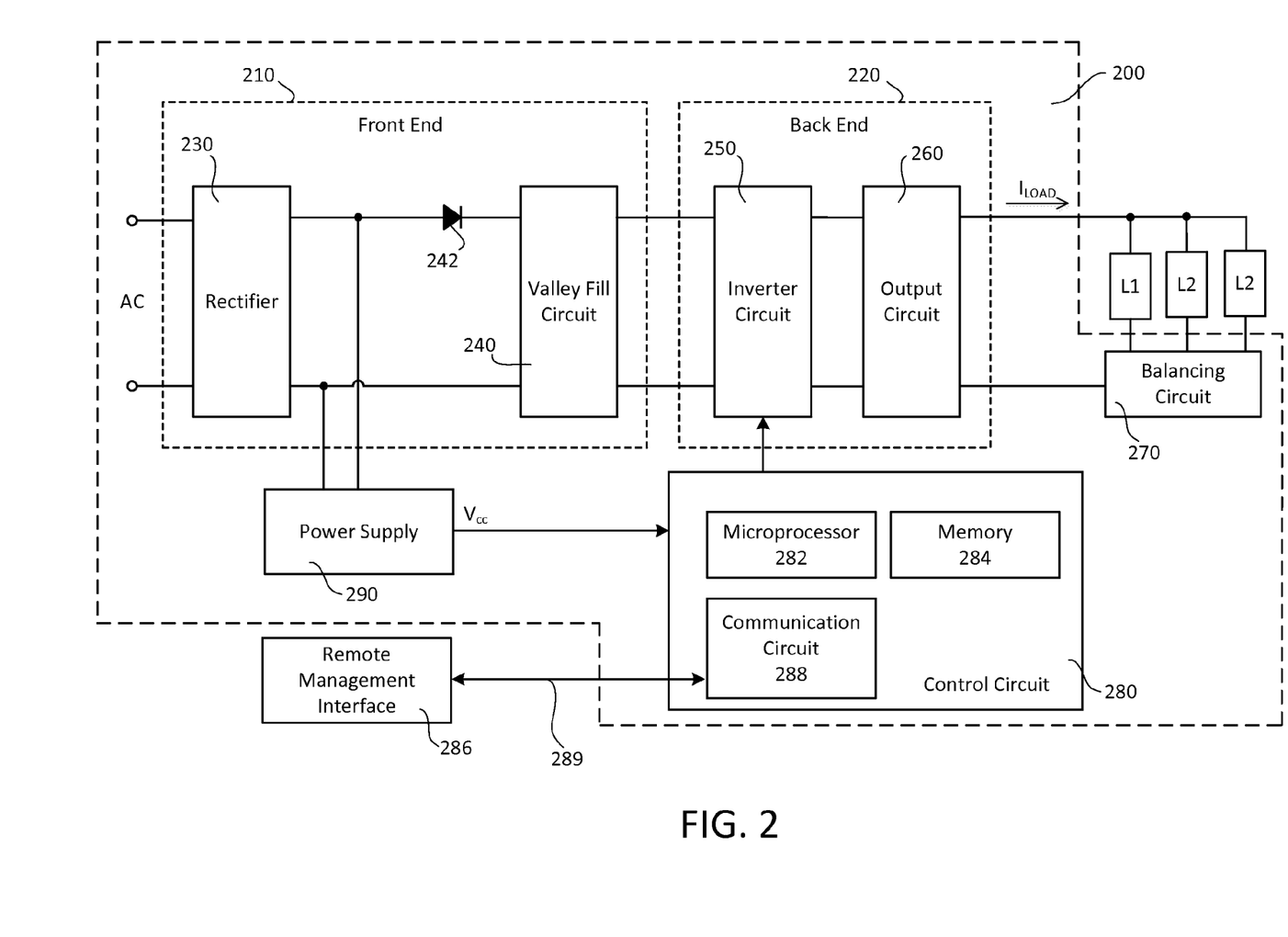
FIG. 2 is a simplified block diagram of a dimming ballast for driving multiple lamps.

An example of an electronic dimming ballast 200 for driving three fluorescent lamps L1, L2, L3 in parallel is shown in FIG. 2. The electronic dimming ballast 200 may drive any number of lamps. Electronic ballasts typically can be analyzed as comprising a front end circuit 210 and a back end circuit 220. The front end circuit 210 typically includes a rectifier circuit 230 (e.g., a full-wave rectifier bridge) for generating a rectified voltage from an alternating-current (AC) line voltage, and a filter circuit, for example, a valley-fill circuit 240, for filtering the rectified voltage to produce a direct-current (DC) bus voltage. The valley-fill circuit 240 may be coupled to the rectifier 230 through a diode 242 and may include one or more energy storage devices that selectively charge and discharge so as to fill the valleys between successive rectified voltage peaks to produce a substantially DC bus voltage. The DC bus voltage may be the greater of either the rectified voltage or the voltage across the energy storage devices in the valley-fill circuit 240.

The back end circuit 220 may include a lamp drive inverter circuit 250 for converting the DC bus voltage to a high-frequency AC voltage, and an output circuit 260 comprising a resonant tank circuit for coupling the high-frequency AC voltage to the lamp electrodes. A balancing circuit 270 may be provided in series with the three lamps L1, L2, L3 to balance the currents through the lamps and to prevent any lamp from shining brighter or dimmer than the other lamps. A control circuit 280 may generate drive signals to control the operation of the lamp drive inverter circuit 250 so as to conduct a desired load current $I_{LOAD}$ through the lamps L1, L2, L3. A power supply 290 may be connected across the outputs of the rectifier 230 to provide a DC supply voltage $V_{CC}$ for powering the control circuit 280.

The control circuit 280 may include one or more processors (e.g., microprocessors), microcontrollers, integrated circuits (e.g., field programmable gate arrays), or the like, in any combination. For example, the illustrated control circuit 280 may include a microprocessor 282 that may execute computer-executable instructions in order to control one or more functional aspects of the ballast electronic dimming ballast 200. The control circuit 280 may be operable to reconfigure a value (e.g., a magnitude) of filament voltages provided to filaments of the lamps L1, L2, L3.

The control circuit 280 may include a memory 284. The memory 284 may be communicatively coupled to the microprocessor 282 and may operate to store information such as computer-executable instructions, configuration settings associated with operation of the electronic dimming ballast 200 (e.g., one or more filament voltage values, a filament voltage lookup table), or the like. The memory 284 may include any component suitable for storing the information. For example, the memory 284 may include one or more components of volatile and/or non-volatile memory, in any combination. The memory 284 may be internal or external with respect to the microprocessor 282. For example, the memory 284 and the microprocessor 282 may be integrated within a microchip. Moreover, the memory 284 may be internal or external with respect to the control circuit 280. During operation of the electronic dimming ballast 200, the microprocessor 282 may store and/or retrieve information, for instance a filament voltage value, from the memory 284. It should be appreciated that the functionality of the control circuit 280 may include any combination of one or more of hardware, firmware, or software.

The electronic dimming ballast 200 may be configured to communicate with a user interface, such as a remote management interface 286 (e.g., a Lutron® Energi Savr Node™ Programming Interface) that is communicatively coupled to the control circuit 280. The remote management interface 286 may include any component suitable for presenting information to and/or receiving information from a user of the electronic dimming ballast 200. For example, the remote management interface 286 may be a user interface rendered on a device in electrical communication with the electronic dimming ballast 200 (e.g., a computer, a tablet, a smartphone, etc.), a discrete device (e.g., a device that includes one or more manually operated input devices such as buttons, switches, etc.), or the like.

The electronic dimming ballast 200 may receive commands, configuration information, or the like, indicated by a user via the remote management interface 286, for example a command to reconfigure a filament voltage value for controlling the magnitude of the filament voltages provided to the filaments of the lamps L1, L2, L3. The electronic dimming ballast 200 may provide information for presentation via the user interface, such as a filament voltage value presently employed by the electronic dimming ballast 200, respective confirmations of one or more commands received from the user and executed by the microprocessor 282, or the like. For example, the electronic dimming ballast 200 may receive input entered by a user via the remote management interface 286, such as an indication of a desired reconfigured filament voltage value, and may confirm receipt and/or implementation of the desired filament voltage value via the remote management interface 286, for instance by rendering an indication on a display.

The electronic dimming ballast 200 may include a communication circuit 288 that is communicatively coupled to the control circuit 280, for example via a communication link 289. The communication link 289 may be any suitable communication link, such as a wired communication link (e.g., an Ethernet link, a power line communication link, etc.), or a wireless communication link (e.g., a Clear Connect RF link, a Wi-Fi link, a cellular wireless link, etc.).

The communication circuit 288 may include one or more components operable for the transmission and/or reception of information comprising signals and/or data. For instance, the communication circuit 288 may include a transceiver, a modem, and/or the like. One or more components of the control circuit 280, for instance the microprocessor 282, may be configured to receive commands and/or configuration information pertaining to operation of the electronic dimming ballast 200 via the communication circuit 288. For example, the microprocessor 282 may receive information, such as operational commands, via the communication circuit 288 from one or more external components, such as the remote management interface 286. One or more components of the control circuit 280, for example the microprocessor 282, may be configured to transmit information via the communication circuit 288. For example, the microprocessor 282 may be configured to communicate a present filament voltage value applied by the electronic dimming ballast 200, for example to the remote management interface 286 for rendering on a display.

The communication circuit 288 may be configured with respective capabilities to transmit and/or receive information in accordance with one or more communication schemes, as desired. For example, the communication circuit 288 may be configured to be capable of transmitting and receiving information via radio frequency (RF) communication, low-voltage communication such as low-voltage differential signaling (LVDS), and/or power line communication (PLC) schemes.

Figure 3:
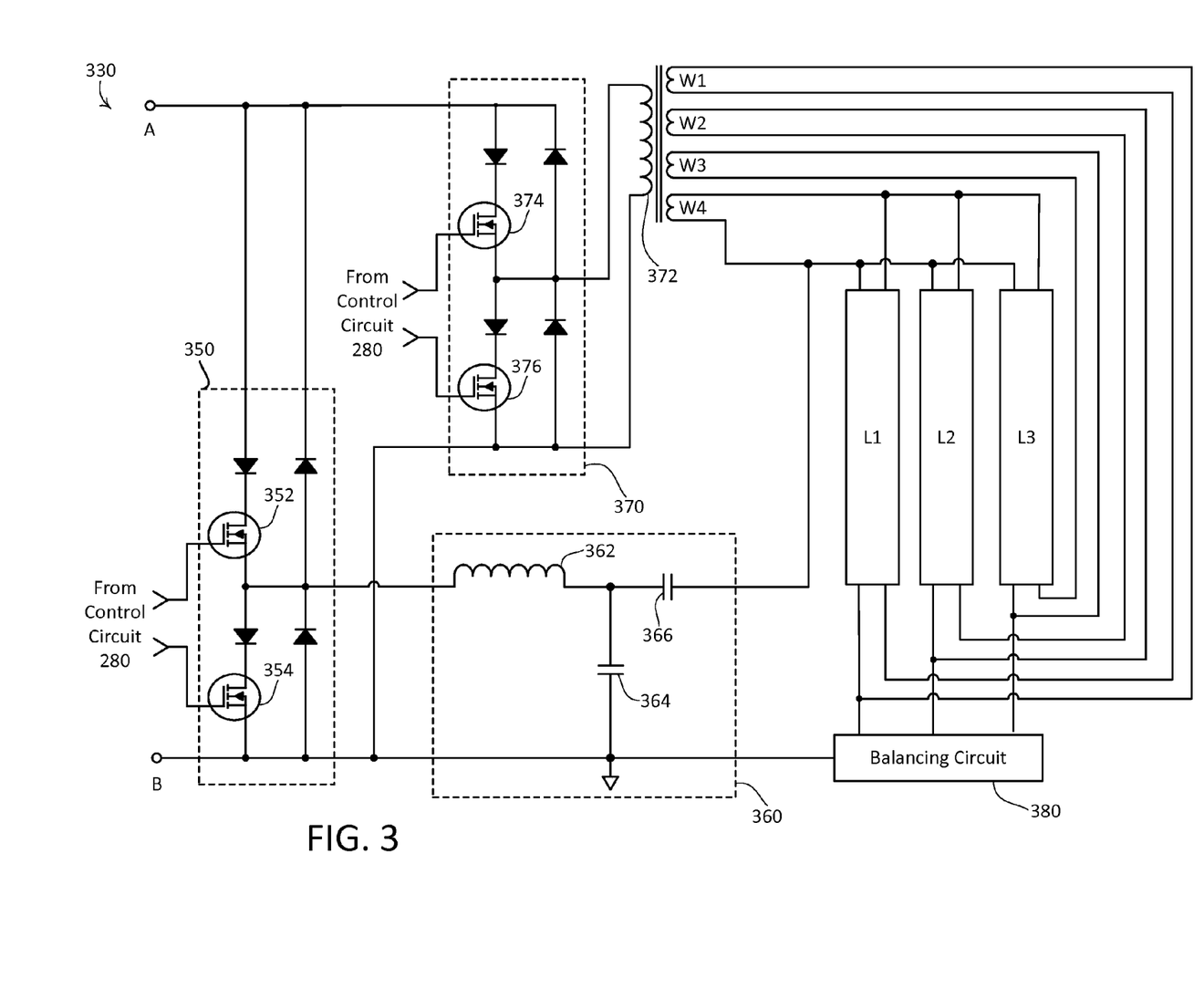
FIG. 3 is a simplified schematic diagram of an example ballast back end circuit having an independent filament drive.

FIG. 3 shows a simplified schematic diagram of an example back end circuit 330 that may be, for example, the back end circuit 220 of the electronic dimming ballast 200 for driving the lamps L1, L2, L3 as shown in FIG. 2. The back end circuit 330 may include a lamp drive inverter circuit 350 that may be, for example, the lamp drive inverter circuit 250 and an output circuit 360 that may be, for example, the output circuit 260. For example, the inverter input terminals A, B may be connected to the output of the valley-fill circuit 240 of the ballast 200 shown in FIG. 2. The lamp drive inverter circuit 350 may generate a high-frequency AC voltage for driving the lamps L1, L2, L3 and may include series-connected first and second switching devices 352, 354, for example, two field-effect transistors (FETs). The output of the lamp drive inverter circuit 350 is connected to the output circuit 360 for coupling the high-frequency AC voltage to the lamps L1, L2, L3. The output circuit 360 comprises a resonant inductor 362, a resonant capacitor 364, and a DC blocking capacitor 366. The output circuit 360 filters the output of the lamp drive inverter circuit 350 to supply a substantially sinusoidal voltage to the parallel-connected lamps L1, L2, L3. The DC blocking capacitor 366 prevents DC current from flowing through the lamps L1, L2, L3. A balancing circuit 380 may be provided in series with the three lamps L1, L2, L3 to balance the currents through the lamps and to prevent any lamp from shining brighter or dimmer than the other lamps. The balancing circuit 380 may be, for example, the balancing circuit 270 of the electronic dimming ballast 200, as shown in FIG. 2.

A control circuit (e.g., the control circuit 280 of the ballast 200 shown in FIG. 2) may drive the FETs 352, 354 of the lamp drive inverter circuit 350 using a complementary duty cycle switching mode of operation, for example a D(1-D) switching technique. This means that one, and only one, of the FETs 352, 354 is conducting at a given time, and at least one of the FETs is conductive at all times. When the FET 352 is conducting, then the output of the lamp drive inverter circuit 350 is pulled upwardly toward the DC bus voltage. When the FET 354 is conducting, then the output of the lamp drive inverter circuit 350 is pulled downwardly toward circuit common.

The illustrated example ballast back end circuit 330 includes a filament drive inverter circuit 370 that may be different from the lamp drive inverter circuit 350. The filament drive inverter circuit 370 may operate to provide AC filament voltages to the filaments of the lamps L1, L2, L3 via a filament drive inductor 372, and may be referred to as an independent filament drive. Filament windings W1, W2, W3, W4 are magnetically coupled to the filament drive inductor 372 of the filament drive inverter circuit 370 and are coupled to the filaments of the lamps L1, L2, L3.

The filament drive inverter circuit 370 may enable independent control of the filament voltage value to which the magnitudes of the AC filament voltages are controlled. For example, the filament drive inverter circuit 370 may be controlled by a control circuit (e.g., the control circuit 280 that controls the lamp drive inverter circuit 350). Alternatively, the filament drive inverter circuit 370 may be controlled by a control circuit (not shown) that is different from the control circuit 280 that controls the lamp drive inverter circuit 350. The frequency of the filament drive inverter circuit 370 may be driven independently of the frequency of the lamp drive inverter circuit 350. The frequency of the filament drive inverter circuit 370 may be driven somewhat independently of the frequency of the lamp drive inverter circuit 350, such as operating at one-half of the frequency of the lamp drive inverter circuit 350, for example.

The filament drive inverter circuit 370 may include series-connected first and second switching devices 374, 376, for example, two field-effect transistors (FETs). The FETs 374, 376 of the filament drive inverter circuit 370 may be driven using a symmetric duty cycle switching mode of operation. This means that the FETs 374, 376 are rendered conductive and non-conductive at the same duty cycle, but are driven to be conductive at different times (e.g., offset from each other). When the FET 374 is conducting, then the output of the filament drive inverter circuit 370 is pulled upwardly toward the DC bus voltage. When the FET 376 is conducting, then the output of the filament drive inverter circuit 370 is pulled downwardly toward circuit common.

The filament windings provide AC filament voltages to the filaments to keep the filaments warm through the entire dimming range. The filaments especially need to be heated when the ballast 200 is dimming the lamps L1, L2, L3 to low end and during preheating of the filaments before striking the lamps. The control circuit 280, for example the microprocessor 282, may retrieve a value corresponding to the filament voltage value from the memory 284 and may cause the filament drive inverter circuit 370, for example the first and second switching devices 374, 376, to apply filament voltages having magnitudes equal to the filament voltage value to the respective filaments of the lamps L1, L2, L3.

The windings W1, W2, W3 may be referred to as independent filament windings because each is coupled to a respective filament of each of several different lamps (e.g., winding W1 is coupled to a filament of lamp L1; winding W2 is coupled to a filament of lamp L2; and winding W3 is coupled to a filament of lamp L3). The winding W4 may be referred to as a common filament winding because it is coupled to the filaments of all three lamps L1, L2, L3. The common filament winding may be electrically connected to the filaments such that the filaments are in series with one another or in parallel with one another. FIG. 3 illustrates the common filament winding as being electrically connected to the filaments such that the filaments are in parallel to one another.

Figure 4:
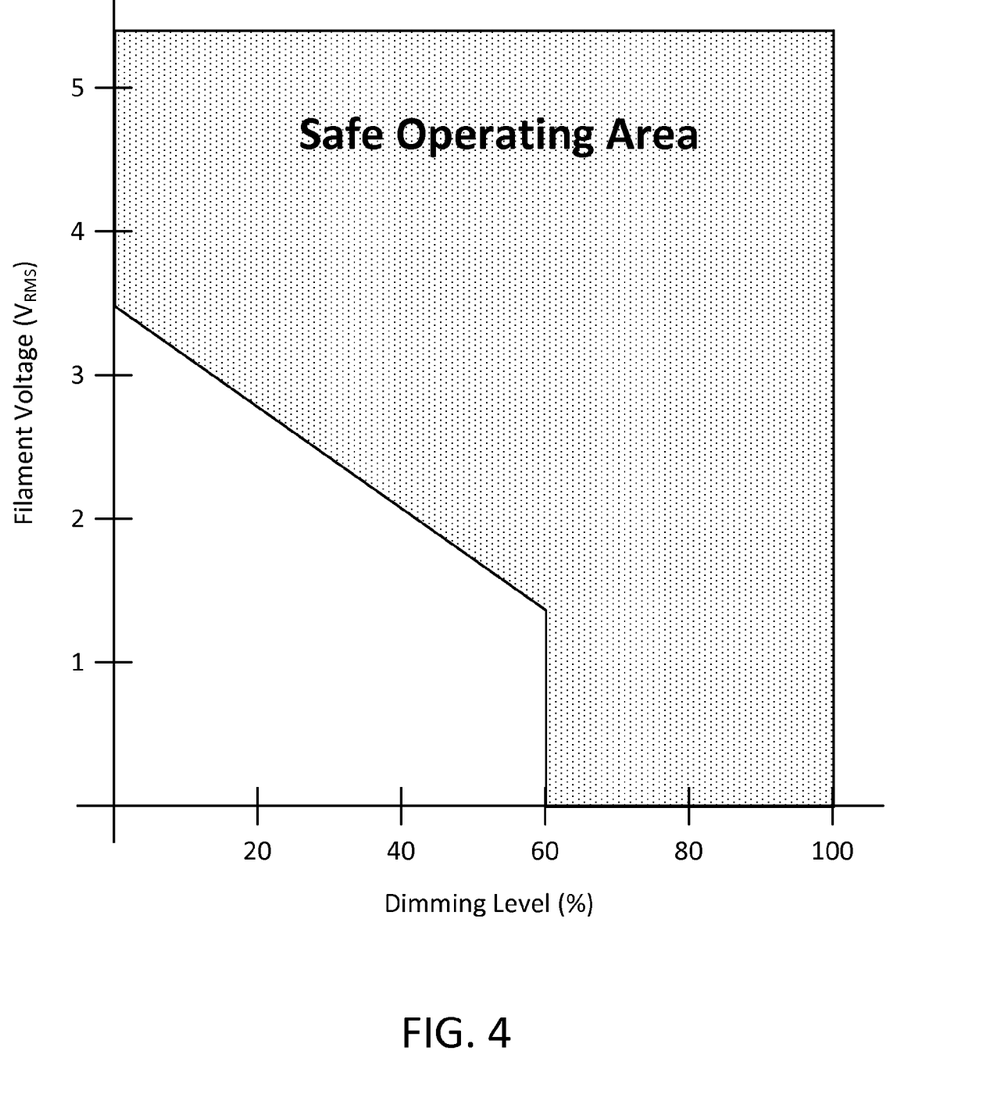
FIG. 4 is a plot of the magnitude of filament voltage versus the dimming level of the ballast illustrating a lamp safe operating area (SOA).

Manufacturers of gas discharge lamps typically establish a safe operating area (SOA) for a particular lamp-type. The SOA may define acceptable magnitudes of the filament voltage and/or current at various dimming levels to maximize the life of the lamp. FIG. 4 illustrates an example safe operating area (SOA) for a particular lamp type. Different manufacturers may establish different respective SOAs, for example for their respective different lamp-types. Accordingly, if a first lamp A is installed and operated in a first ballast at a first heating voltage value, or first filament voltage value, it may operate within an associated hot-to-cold cathode resistance ratio (Rh/Rc) range.

Figure 5:
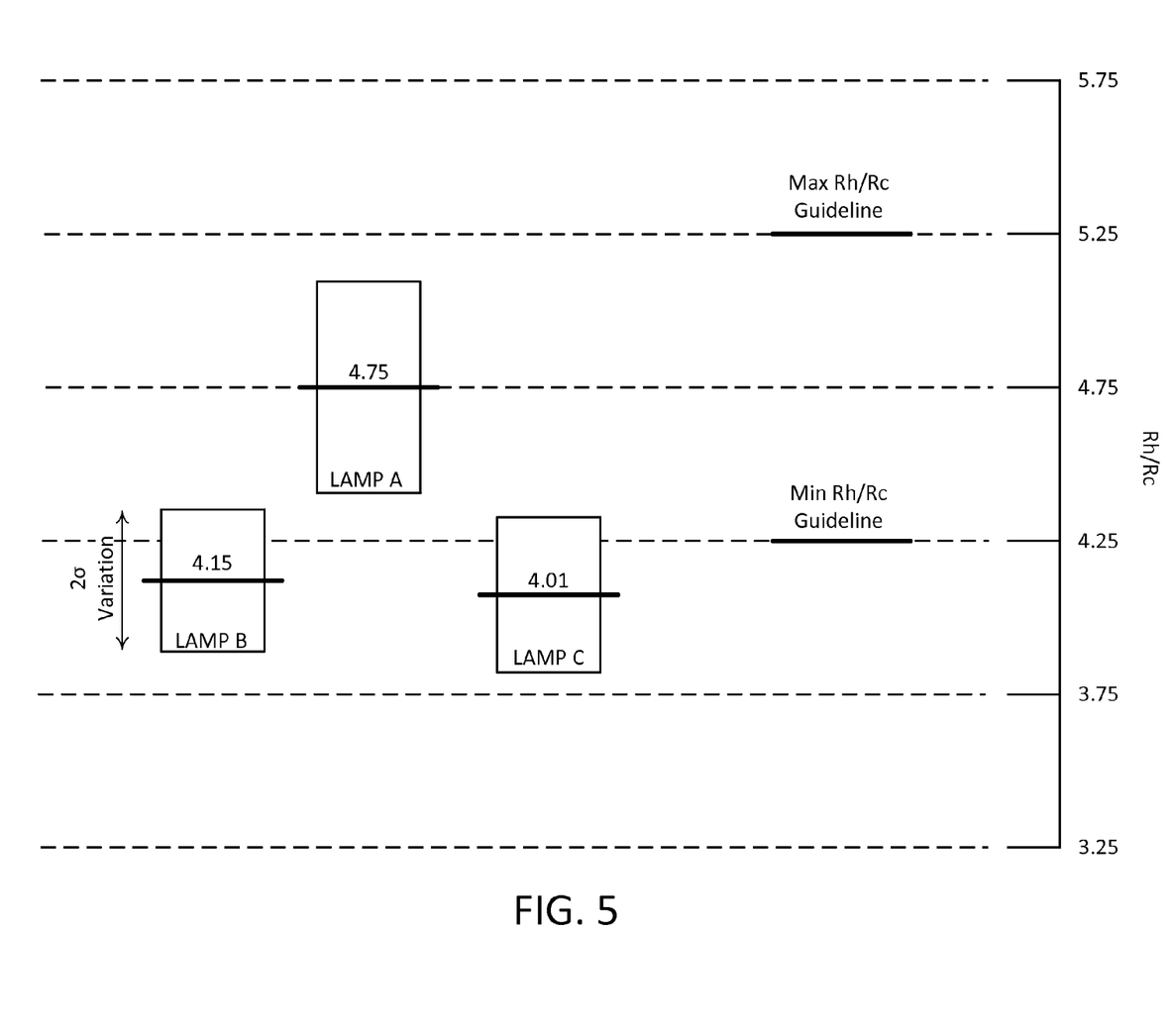
FIG. 5 is a plot of respective hot/cold cathode resistance ratio values for three example gas discharge lamps from different manufacturers.

For example, FIG. 5 depicts a plot of Rh/Rc for three different lamps including a first lamp A, a second lamp B, and a third lamp C. One of the lamps, for example the first lamp A, may be installed in (e.g., coupled to) a first ballast that heats the filaments of the first lamp A in accordance with a first filament voltage value. The first ballast may be configured to apply a pre-determined filament voltage value to the filaments of the first lamp A, for example via an independent filament drive, such that the first lamp A exhibit a Rh/Rc of approximately 4.75, within a predetermined, preferred Rh/Rc operating range of the first ballast of approximately 4.25 to approximately 5.25.

Lamp types other than the first lamp A, for example the second lamp B or the third lamp C from respective different manufacturers, may be designed with respective SOAs that are different from the SOA of the first lamp A, such that when the second lamp B or the third lamp C is installed and operated in the first ballast at the first filament voltage value, the respective Rh/Rc operating ranges of the second lamp B or the third lamp C may fall outside the preferred Rh/Rc operating range of with the first ballast, particularly at low dimming levels. For example, the second lamp B, when coupled to the first ballast and operated at the first filament voltage value, may exhibit a Rh/Rc of approximately 4.15, outside the preferred Rh/Rc operating range of the first ballast, as illustrated in FIG. 5. Similarly, the third lamp C, when coupled to the first ballast and operated at the first filament voltage value, may exhibit a Rh/Rc of approximately 4.01, outside the preferred Rh/Rc operating range of the first ballast.

Accordingly, it would be desirable for a ballast to accommodate various lamp types, such that a preferred Rh/Rc operating range of the ballast may be maintained regardless of what lamp type is installed and operated in the ballast.

Configuring a ballast so as to enable reconfigurable filament voltage value may accommodate the use of different lamp types. For example, reconfigurable values of the filament voltage may be achieved via software, for example software executed by a control circuit (e.g., by the microprocessor 282 of the control circuit 280). In accordance with an embodiment, a ballast back end circuit (e.g., the back end circuit 330) may be enabled for reconfigurable filament voltage values via a software control, for example a software control implemented in a control circuit (e.g., the control circuit 280) that drives the filament drive inverter circuit 370.

The control circuit 280 may be manually configured with an initial filament voltage value, for example at a time of manufacture of the ballast and/or at a time when the voltage is installed. The initial filament voltage value may be stored by the control circuit 280. The initial filament voltage value may correspond with a particular type of lamp that is to be installed and operated in the ballast, for example.

The initial filament voltage value may be, may be stored in the memory 284 so as to be retrievable by the microprocessor 282, for example, or may be otherwise stored by the electronic dimming ballast 200. For example, the ballast 200 may be configured with the initial filament voltage value at the time of manufacture, for example stored in the memory 284 before the ballast 200 is shipped to a consumer. Alternatively, the ballast 200 may be configured with the initial filament voltage value at a time after manufacture, for example entered via the remote management interface 286 and stored in the memory 284 after the ballast 200 has been installed. For example, a plurality of ballasts 200 may be installed at a single location, such as a customer premises. The plurality of ballasts 200 may be individually wired, may be networked together (e.g., in a mesh network), or may be otherwise installed, for example partially individually and partially networked, installed in multiple discrete networks, etc. If the ballasts 200 are individually installed, a respective initial filament voltage value may be separately stored by each ballast 200, for example in the respective memory 284 of each ballast 200. If the ballasts 200 are networked, an initial filament voltage value may be communicated substantially simultaneously to all ballasts participating in the network, for example via one or more broadcasts received via the respective communication circuit 288 of each ballast 200.

The ballast 200 may operate in accordance with an initial, or first, filament voltage value for a period of time, for example until one or more lamps coupled to the ballast 200 are replaced. If the presently installed lamps are to be replaced with lamps of a different particular type (e.g., a different brand), the ballast 200 may be reconfigured with a second filament voltage value that is different from the first filament voltage value, for instance if the replacement lamps require the second filament voltage value to operate in accordance with a preferred Rh/Rc range of the ballast 200. The ballast 200 may be commanded to operate at the second filament voltage value. For example, in accordance with a plurality of networked ballasts 200, a central control function may distribute an instruction to the plurality of ballasts 200, for example via broadcast, to cease operating at the first filament voltage value and to resume operating at the second filament voltage value.

The ballast 200 may be reconfigured to operate in accordance with a second filament voltage value and may store the second filament voltage value in a location in its memory 284 that stores the first filament voltage value. For example, a ballast 200 may overwrite the first filament voltage value with the reconfigured, second filament voltage value in its memory 284, such that when the ballast 200 is subsequently powered on, the microprocessor will retrieve the second filament voltage value from its memory and cause the ballast 200 to operate in accordance with the second filament voltage value.

The second filament voltage value may be predetermined. For example, a lookup table (e.g., stored in the memory 284) that pertains to a particular ballast 200 may contain one or more lamp types and associated filament voltage values that will cause the ballast 200 to operate in accordance with a preferred Rh/Rc range of the ballast 200. The lookup table may be consulted when the particular lamp type coupled to a ballast 200 changes. For example, if lamps of a first lamp type are removed from a ballast 200 and replaced with lamps of a second lamp type, the lookup table can be queried, for example by the microprocessor 282, such that a corresponding filament voltage value associated with the second lamp type is retrieved from the lookup table and employed by the ballast 200. These operations may, for example, be performed by the control circuit 280 of the ballast (e.g., by the microprocessor 282) and/or by a central control function associated with a network if the ballast 200 is networked with one or more other ballasts. It should be appreciated that reconfiguring the filament voltage value of the ballast 200 is not limited to the lamp replacement described herein, and that the filament voltage value of the ballast may be reconfigured at any suitable time as desired. Alternatively, the lookup table may be stored in the remote management interface 286, which may transmit a filament voltage value to the ballast 200.

Referring now to FIGS. 6A-6B and 7A-7B, a ballast 200 may be configured to automatically assign a suitable filament voltage value. One or both of example filament voltage reconfiguration methods 700 and 750, may be performed to reconfigure the filament voltage value of a ballast 200.

Figure 7A:
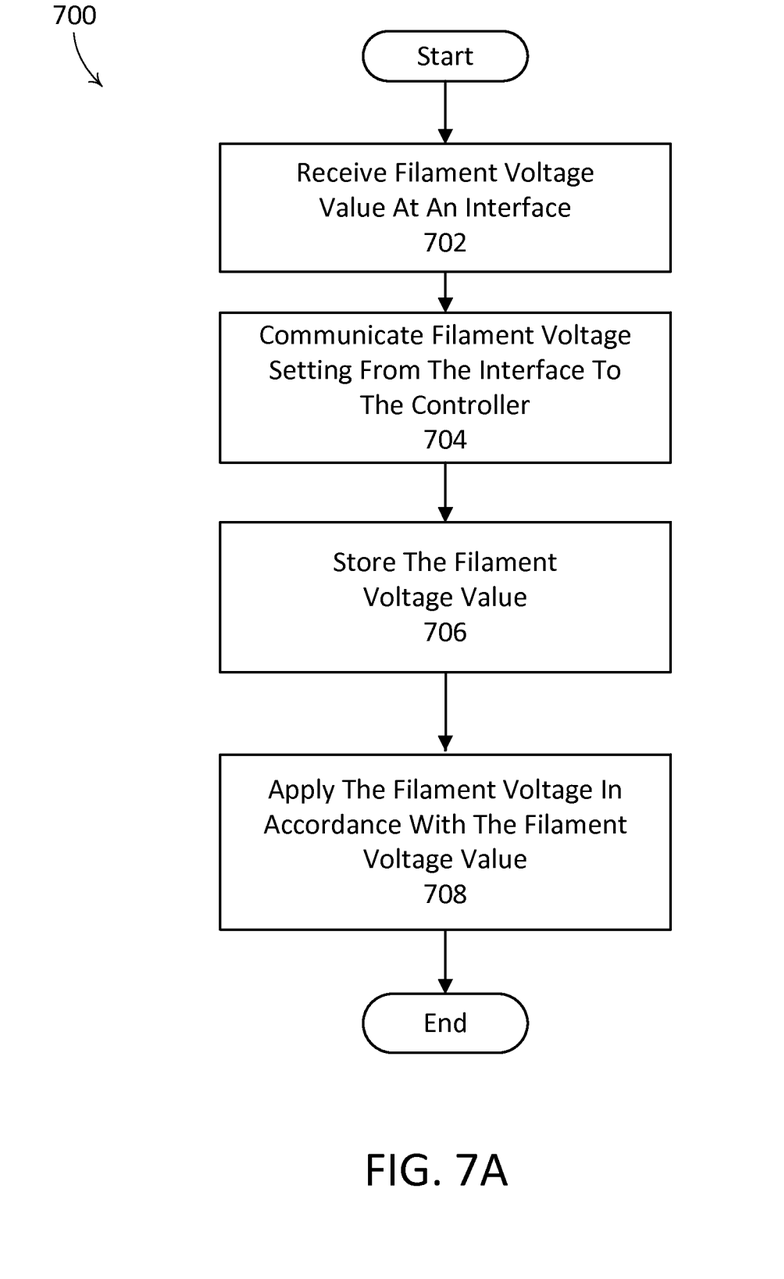
FIG. 7A is a flow chart illustrating a first example method of reconfiguring a filament voltage applied to a gas discharge lamp.

In accordance with a first example filament voltage reconfiguration method 700 illustrated in FIG. 7A, a ballast 200 may be commanded to operate in accordance with a predetermined filament voltage value. The first example filament voltage reconfiguration method 700 may begin at 702, when an interface associated with the ballast 200, for example the remote management interface 286, receives a command from a user to reconfigure the filament voltage value of the ballast 200. The command may include the user entering an integer value, for example, that corresponds with a particular type of lamp that may be coupled to the ballast 200.

At 704, the command may be communicated to the control circuit 280 of the ballast 200 as an indication (e.g., a signal) to reconfigure the filament voltage value of the ballast 200. For example, the indication may be communicated to the ballast 200 from the remote management interface 286 via the communication circuit 288, over the communication link 289. The ballast 200 may be operating in accordance with an initial filament voltage value when the indication to reconfigure the filament voltage value is received by the communication circuit 288.

At 706, the indication may be processed by the control circuit 280. For example, in accordance with the illustrated embodiment, the microprocessor 282 may parse the indication in order to retrieve the integer value. The microprocessor 282 may use the integer value to reference a lookup table, for example stored in the memory 284, that includes a first entry including the integer value and a second entry associated with the first entry that includes a second filament voltage value that is different from the initial filament voltage value. The initial filament voltage value may correspond to a first lamp that was coupled to the ballast, for example, and the second filament voltage value may correspond to a second lamp that was coupled to the ballast 200 as a replacement of the first lamp.

Also at 706, the microprocessor 282 may cause the second filament voltage value to be stored in the memory 284. For example, the microprocessor 282 may cause the second filament voltage value to overwrite the initial filament voltage value in the memory 284.

At 708, the control circuit 280 may cause the ballast 200 to apply the second filament voltage value in accordance with the indication. For example, the microprocessor 282 may command the filament drive inverter circuit 370 to apply filament voltages having magnitudes equal to the second filament voltage value to the filaments of the lamps L1, L2, L3. With application of the second, reconfigured filament voltage value, the first example filament voltage reconfiguration method 700 may end.

Figure 7B:
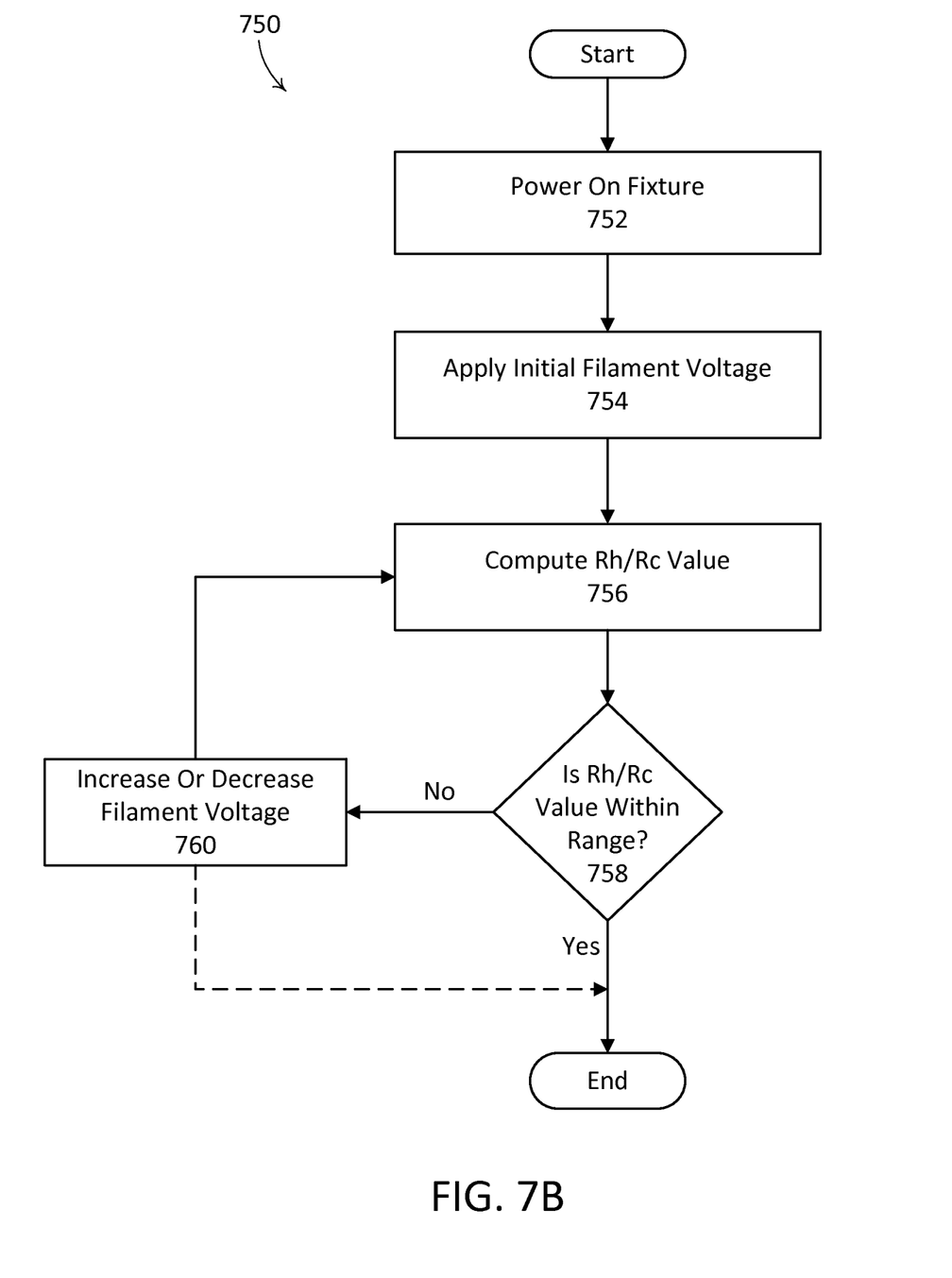
FIG. 7B is a flow chart illustrating a second example method of reconfiguring a filament voltage applied to a gas discharge lamp.

In accordance with a second example filament voltage reconfiguration method 750 illustrated in FIG. 7B, a ballast 200 may determine a suitable filament voltage value based, for example, upon a computed Rh/Rc value and/or a measured value of a target parameter indicative of a heating level of one or more respective filaments of one or more lamps coupled to the ballast 200. The second example filament voltage reconfiguration method 750 may begin at 752, when a lamp fixture, for example a gas discharge lamp fixture 100 having a ballast 200, is powered on (e.g., switched on).

At 754, the ballast may apply an initial filament voltage value. The initial filament voltage value may be predetermined, for example retrieved from the memory 284 by a control element associated with the ballast 200 (e.g., the microprocessor 282 and/or a central control function of a network of ballasts if the ballast 200 is networked). Alternatively, the ballast 200 may determine the initial filament voltage value, for example using a computed Rh/Rc value.

At 756, the ballast may compute an Rh/Rc value, for example responsive to the lamp fixture being powered on. The control circuit 280, for example the microprocessor 282, may compute a cold cathode resistance (Rc) value of one or more filaments of the lamps. The microprocessor 282 may compute the Rc value using the initial filament voltage value supplied to at least one of the filaments of the lamps and a first measurement of a corresponding current conducted through the at least one of the filaments, taken substantially coincident with the lamp fixture being powered on, for example. The Rc value may be computed, for example, by dividing the initial filament voltage by the first filament current measurement.

The microprocessor 282 may subsequently compute a hot cathode resistance (Rh) value of one or more filaments of the lamps. The microprocessor 282 may compute the Rh value using the initial filament voltage value supplied to the at least one of the filaments of the lamps and a second measurement of the corresponding current conducted through the at least one of the filaments, taken at a time after the filaments of the lamps reach an operating temperature, for example approximately 0.5 seconds after the lamp fixture is powered on. The Rh value may be computed, for example, by dividing the initial filament voltage by the second filament current measurement. The microprocessor 282 may use the computed values of Rc and Rh to compute a hot-to-cold cathode resistance ratio (Rh/Rc) for the lamps coupled to the ballast 200.

In accordance with the illustrated embodiment, the first and second measurements of the filament current, may be aggregate measurements corresponding to all of the filaments of all of the lamps coupled to the ballast (e.g., all of the filaments of each of lamp L1, L2, L3). Accordingly, the Rh/Rc value computed by the microprocessor 282 represents an aggregate Rh/Rc value for the entire ballast 200. Alternatively, the filament current of each filament may be measured independently, and independent Rh/Rc values corresponding to individual lamps may be computed therefrom; or the filament current of at least one filament (e.g., a single filament of a single lamp) may be measured, and a single representative Rh/Rc value may be computed therefrom.

At 758, the control element may determine whether the computed Rh/Rc value is within a preferred Rh/Rc operating range of the ballast 200. If the computed Rh/Rc value is within the preferred range of the ballast, the second example filament voltage reconfiguration method 750 may end with the microprocessor 282 designating the initial filament voltage value as an operating filament voltage value of the ballast 200. The microprocessor 282 may cause the operating filament voltage value to be stored in the memory 284, for example overwriting the initial filament voltage value.

It should be appreciated that if the computed Rh/Rc value is substantially equal to one (1), for example if the Rh/Rc value corresponds to a lamp that has resistors in place of the cathodes of a gas discharge lamp (e.g., an LED tube lamp), the microprocessor 282 may set the operating filament voltage value of the ballast 200 to zero (0) and may store the operating filament voltage value in the memory 284, for example overwriting the initial filament voltage value. Setting the filament voltage value to zero for an LED lamp may save power that would otherwise be wasted by applying the filament voltage to the resistors of the LED lamp.

If the computed Rh/Rc value is not within the preferred range of the ballast, the microprocessor 282, for example, may cause the filament drive inverter circuit 370 to adjust the filament voltage, by providing a higher or lower magnitude of filament voltage at 760, in order to bring the computed Rh/Rc value within the preferred range, and the second example filament voltage reconfiguration method 750 may end.

Alternatively, the second example filament voltage reconfiguration method 750 may continue to 756, with computing an adjusted Rh/Rc value corresponding to the adjusted filament voltage value may be computed. The second example filament voltage reconfiguration method 750 may further continue to 758 and a determination may be made whether the adjusted Rh/Rc value is within the preferred range of the ballast. These adjustment steps, for example returning to one or both of 756 and 758, may be performed one or more times, for example until an Rh/Rc value that is within the preferred range of the ballast is determined.

Once an Rh/Rc value that is within the preferred range of the ballast is determined, the second example filament voltage reconfiguration method 750 may end with the microprocessor 282 designating the adjusted filament voltage value as an operating filament voltage value of the ballast 200. The microprocessor 282 may cause the operating filament voltage value to be stored in the memory 284, for example overwriting the initial filament voltage value.

Figure 6A:
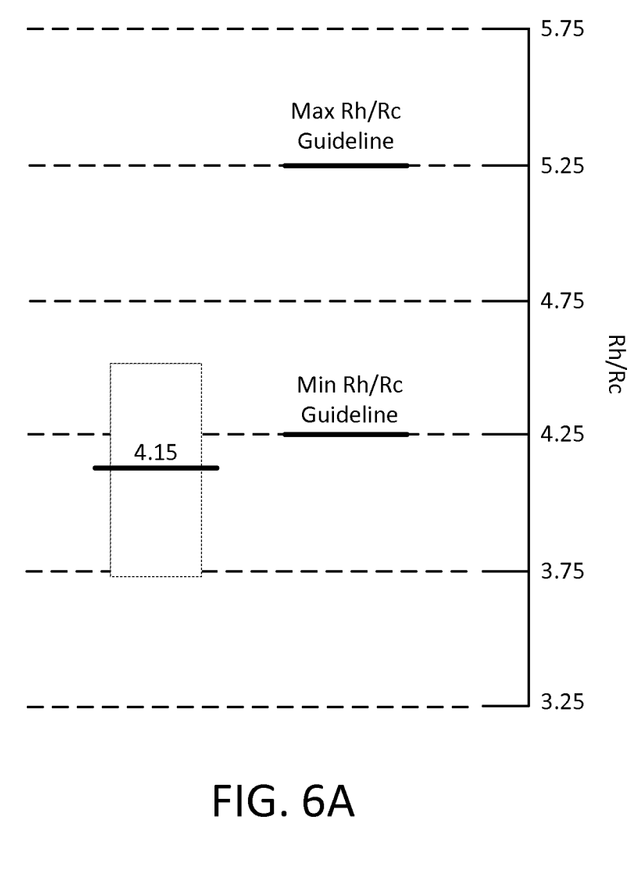
FIGS. 6A and 6B are plots illustrating reconfiguring a filament voltage applied to a gas discharge lamp responsive to a measured hot/cold cathode resistance ratio value.
Figure 6B:
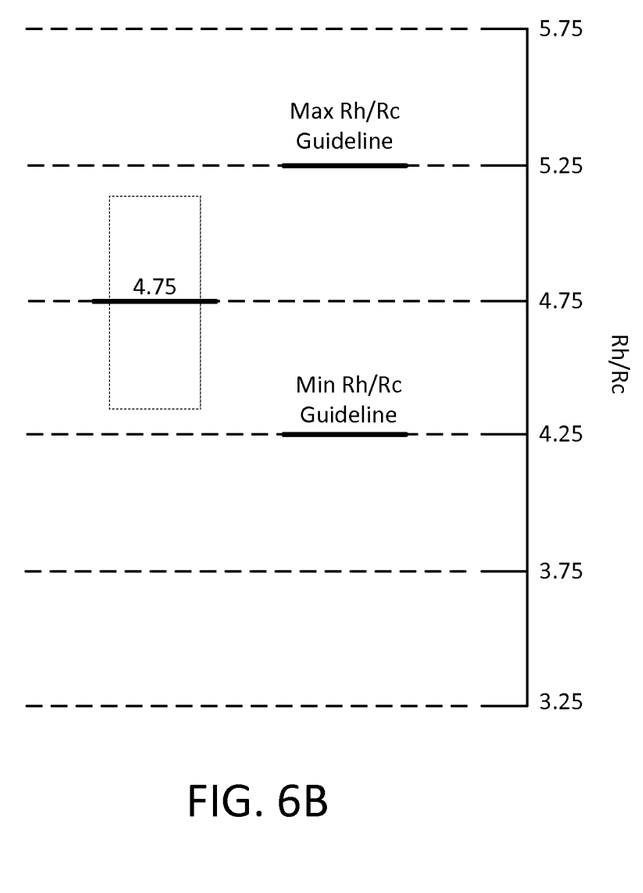

To illustrate, in accordance with the illustrated example of FIG. 6A, a lamp, upon a fixture to which the lamp is coupled being powered on, may operate at a Rh/Rc value of 4.15 in accordance with an initial filament voltage value provided by an associated ballast, which Rh/Rc value may be outside a preferred Rh/Rc range of the ballast (e.g., the illustrated preferred Rh/Rc range of 4.25 to 5.25). The control circuit 280 of the ballast 200, for example the microprocessor 282, may compute the Rh/Rc value of 4.15, determine that the computed Rh/Rc value is not within the preferred range of 4.25 to 5.25, and may supply an adjusted (e.g., higher) filament voltage value to the filaments of the lamp, such that lamp operates in accordance with an adjusted Rh/Rc value (e.g., 4.75) that is within the preferred range of the ballast 200, as illustrated in FIG. 6B.

In accordance with a modified second example filament voltage reconfiguration method 750, one or both of 756 and 758 may be different. For example, at 756, the ballast 200 may measure respective values of one or more target parameter indicative of a heating level of one or more filaments of one or more respective lamps coupled to the ballast 200 (e.g., a current heating level of the one or more filaments). The target parameter may include one or more of a cathode voltage applied by filament drive inverter circuit 370 to the one or more filaments, a cathode current supplied to the one or more filaments by the filament drive inverter circuit 370, or a cathode power delivered to the one or more filaments by the filament drive inverter circuit 370, or the like. At 758, the microprocessor 282, for example, may determine whether the one or more measured target parameter values are within one or more corresponding ranges specified for the ballast 200. Dependent upon the determination at 758, the magnitude of the filament voltage may be adjusted, for example as described elsewhere herein. In accordance with the modified second example filament voltage reconfiguration method 750, one or more filament voltage adjustment steps, for example returning to one or both of 756 and 758 as described elsewhere herein, may be performed one or more times, for example until the one or more measured target parameter values fall within their respective preferred ranges.

It should be appreciated that the first and second example filament voltage reconfiguration methods 700, 750 are not limited to initiation coincident with powering on the lamps of a ballast, and that one or more steps of the first and/or second example filament voltage reconfiguration methods 700, 750 may be performed at any suitable time. For example, a control element associated with a ballast may cause the ballast to periodically compute the Rh/Rc value, for instance to ensure that the filaments of one or more lamps coupled to the ballast are being heated in accordance with the preferred Rh/Rc operating range of the ballast. It should further be appreciated that a ballast is not limited to execution of only one of the first and second example filament voltage reconfiguration methods 700, 750. For example, a ballast may execute one or more steps of both of the first and second example filament voltage reconfiguration methods 700, 750, for example at different times.

What is claimed:

1. A method of reconfiguring an alternating current filament voltage for use by an electronic dimming ballast, the method comprising:
    supplying a first filament voltage to a filament of a lamp installed with the electronic dimming ballast;
    receiving a signal indicative of supplying a second filament voltage to the filament that is different from the first filament voltage, wherein the signal includes an integer value pertaining to a particular type of the lamp installed with the electronic dimming ballast; and
    supplying the second filament voltage to the filament.

2. The method of claim 1, wherein the signal is received from a control circuit in electrical communication with the electronic dimming ballast.

3. The method of claim 1, wherein the electronic dimming ballast is electrically connected to a ballast network and the signal is received from a central control function associated with the ballast network.

4. The method of claim 1, further comprising referencing, by a control circuit in electrical communication with the electronic dimming ballast, a lookup table that includes a first entry pertaining to the integer value and a second entry that includes the second filament voltage, wherein the first and second entries are associated with one another.

5. The method of claim 1, further comprising:
    computing a hot-to-cold cathode resistance ratio associated with the lamp; and
    determining whether the computed hot-to-cold cathode resistance ratio is within a range specified for the electronic dimming ballast.

\* \* \* \* \*